Nov. 29, 1927. 1,651,268
J. P. GILMOUR
LOCK NUT
Filed Jan. 26. 1925
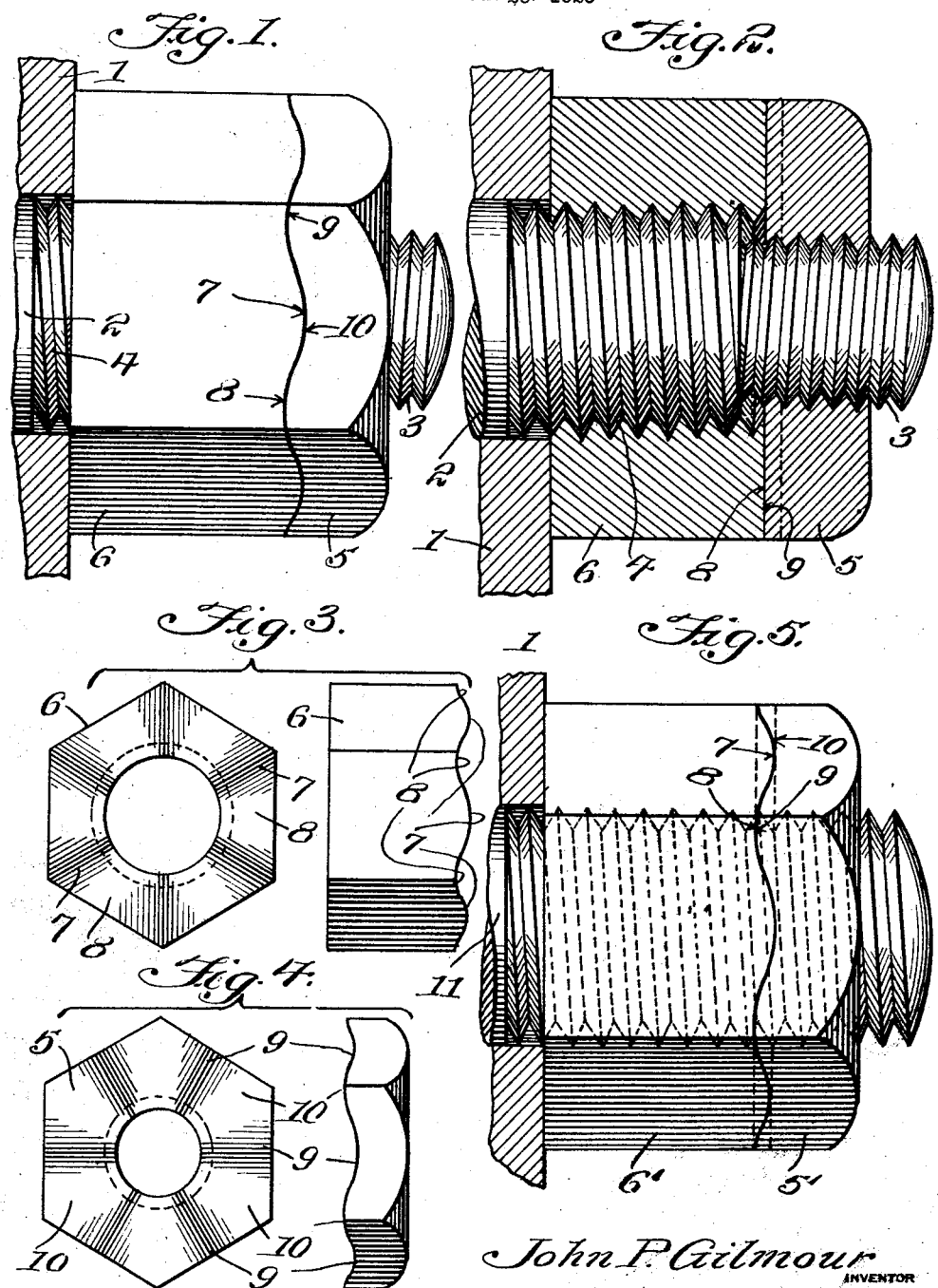
John P. Gilmour
INVENTOR
BY Victor J. Evans
ATTORNEY
WITNESS: J. T. L. Wright Patented Nov. 29, 1927.

1,651,268

UNITED STATES PATENT OFFICE.

JOHN P. GILMOUR, OF TERRE HAUTE, INDIANA.

LOCK NUT.

Application filed January 26, 1925. Serial No. 4,917.

My present invention has reference to a means for securely locking a nut on a bolt.

My object is the provision of a nut lock in which a nut is engaged by a flexible outer or lock nut in a manner to prevent either of such nuts turning in an unscrewing direction on a bolt.

A further object is the provision of a nut which has its outer face provided with radially disposed rounded ribs and concaved grooves between the ribs and wherein a flexible lock nut has its inner face shaped complementary to the outer face of the main nut and whereby the ribs of the lock nut will gracefully glide into the grooves of the main nut when both nuts are screwed home, with the result that the main nut is effectively locked on the bolt.

With the above recited objects in view and others which will appear as the nature of the invention is better understood, reference is to be had to the drawings which accompany and which form part of this application.

In the drawings:—

Figure 1 is an elevation of a nut locked on a bolt in accordance with this invention.

Figure 2 is a central longitudinal sectional view through the construction disclosed in Figure 1, the bolt being in elevation.

Figure 3 shows a side elevation and a face view of the main or standard nut.

Figure 4 shows an inner face view and side elevation of the locking nut.

Figure 5 is a view similar to Figure 1, but showing the improvement arranged on a bolt not provided with different hand pitch threads.

Passing through a substructure 1 there is the threaded end of a bolt 2. In the preferred embodiment of the improvement, the bolt 2 has its outer end reduced and provided with threads 3 which are of a different hand pitch than the main threads 4.

Screwed on the threads 4 of the bolt there is a main or standard nut 6. This nut has its outer face provided with radially disposed rounded ribs 7 and rounded depressions 8 between the ribs.

Screwed on the threaded end 3 of the bolt 4 there is a lock nut 5. This lock nut is approximately one-half of the thickness of the main nut 6, or may be of a less thickness and has its inner face provided with radially disposed outwardly rounded ribs 9 and rounded concavities 10 between the ribs. The curvature of the ribs and grooves is slow, that is, the ribs are comparatively wide at the outer portions thereof as are the intersecting grooves. The lock nut 5, while of stamped steel is flexible so that the same, when screwed on the threads 3 of the bolt, will allow its ribs 9 to glide over the ribs 7 of the main or standard nut and to snap into the grooves 8 of the said standard nut, and whereby the standard nut is effectively locked on the bolt.

In Figure 5, the construction is similar to that described, except that the bolt 11 has its threaded portion of an equal diameter throughout and the threads are of the same hand pitch. The main or standard bolt 6' has its corrugated face engaged by the corrugated face of the lock bolt 5' when the bolts are screwed home. By reference to the drawings it will be noted that the ribs in both the nut and the lock nut are equidistantly spaced, that the ribs are of a length equaling that of the grooves, and likewise that the grooves are of a depth equaling the distance the ribs are projected from the nut. Further it is to be considered that the ribs of the improvement are not to be considered in the nature of teeth, as there is not what may be termed a biting engagement between the walls of the cooperating ribs and grooves, but rather a frictional clamping engagement which is brought about by the resiliency of the outer or lock nut 5 or 5' and a slight resiliency or yielding of the threads of the bolt, with the result that a comparatively free gliding of the lock nut over the main nut is attained without liability of stripping the threads of the bolt.

The simplicity of my improvement and the advantages thereof will, it is thought, be apparent to those skilled in the art to which such inventions relate.

Having described the invention, I claim:—

A locking means for bolts, comprising an ordinary nut, having slight corrugations in its outer face, a thin lock nut formed of spring steel threaded on the bolt as the ordinary nut, corrugations formed on the inner face of the lock nut to correspond with those on the outer face of the nut, the said corrugations being shallow and the distance between crests comparatively long so that the lock nut by reason of its resiliency will ride over the crests of the corrugations until the inner face of the nut lock and the outer face of the ordinary nut contact at all points.

In testimony whereof I affix my signature.

JOHN P. GILMOUR.